United States Patent [19]

Moore

[11] 3,760,575

[45] Sept. 25, 1973

[54] HAY TEDDING MACHINE
[75] Inventor: Robert F. Moore, Rutland, Vt.
[73] Assignee: G.H. Grimm Co., Inc., Rutland, Vt.
[22] Filed: Apr. 18, 1972
[21] Appl. No.: 245,165

[52] U.S. Cl............... 56/370, 56/11.6, 56/13.5, 56/15.8
[51] Int. Cl............................................. A01d 79/00
[58] Field of Search................. 56/370, 192, 11.6, 56/13.5, 13.6, 15.8, 6

[56]   References Cited
       UNITED STATES PATENTS

| 3,267,656 | 8/1966  | Van der Lely  | 56/370  |
| 3,496,712 | 2/1970  | Purrer et al. | 56/370  |
| 3,509,707 | 5/1970  | Stampfer      | 56/370  |
| 3,543,489 | 12/1970 | Maier et al.  | 56/10.4 |
| 3,545,184 | 12/1970 | Liepold et al.| 56/6    |
| 3,583,139 | 6/1971  | Purrer        | 56/370  |
| 3,690,055 | 9/1972  | Reber         | 56/370  |

FOREIGN PATENTS OR APPLICATIONS

| 439,844   | 12/1967 | Switzerland   | 56/370 |
| 1,195,198 | 6/1970  | Great Britain | 56/370 |
| 1,245,336 | 9/1971  | Great Britain | 56/370 |

Primary Examiner—Russell R. Kinsey
Attorney—Harvey B. Jacobson et al.

[57]             ABSTRACT

Rotary raking implements of a hay tedding machine are mounted at the ends of a central beam and at the ends of a pair of outer support beams pivotally extended from the central beam. Endless drive belts drivingly interconnect the outer raking implements with those at the ends of the central beam and are supported substantially in planes common with the horizontal axes about which the outer support beams are vertically displaceable relative to the central beam, establishing a continuous and yieldable drive for all of the rotary raking implements in all positions of the outer beams relative to the central beam.

21 Claims, 9 Drawing Figures

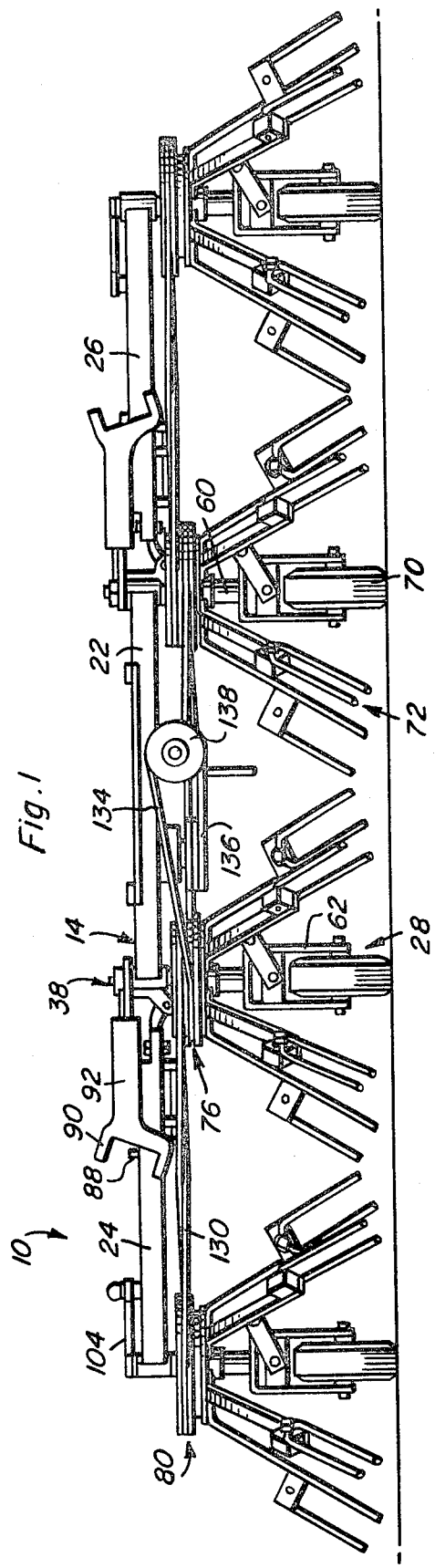
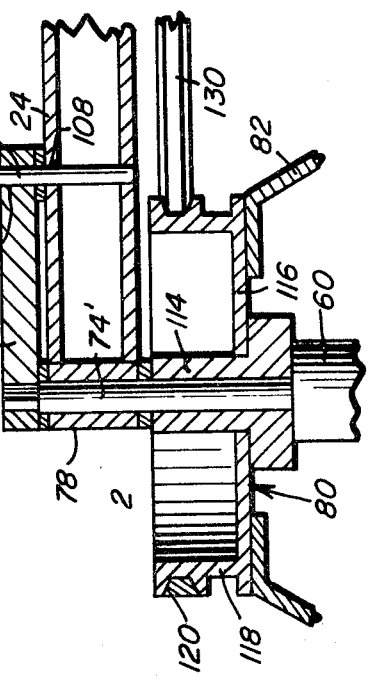
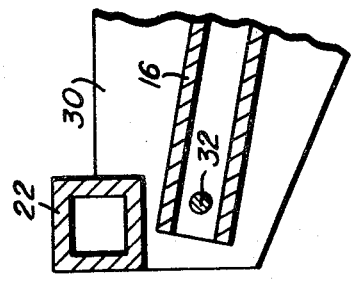

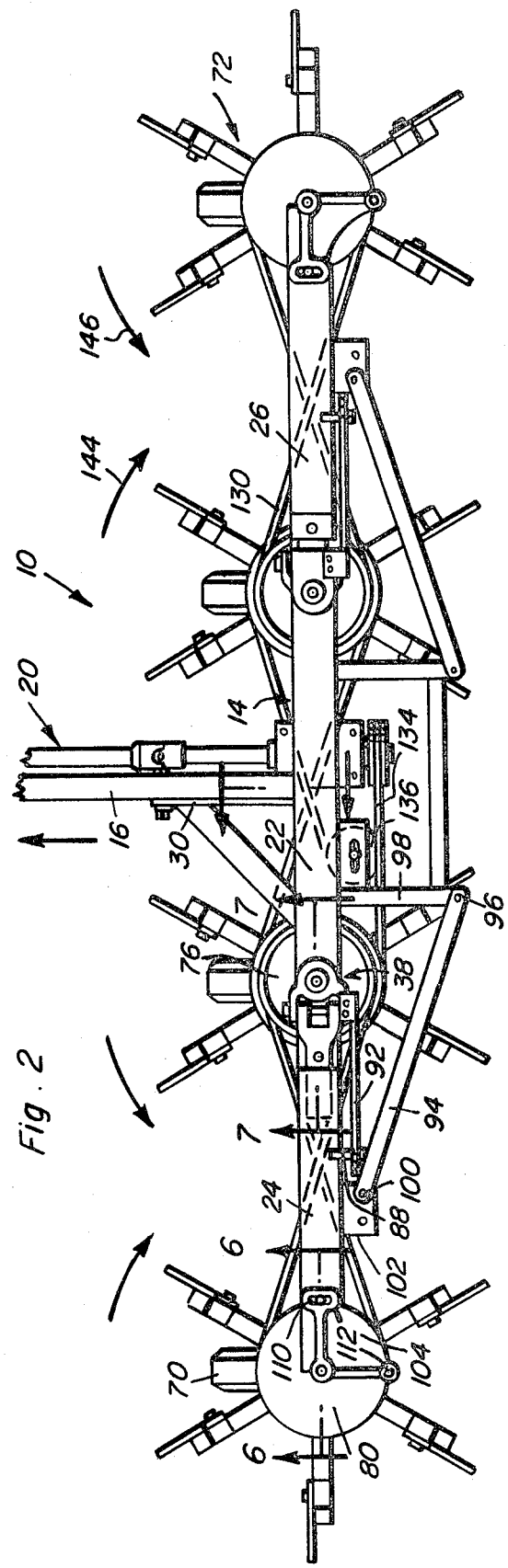
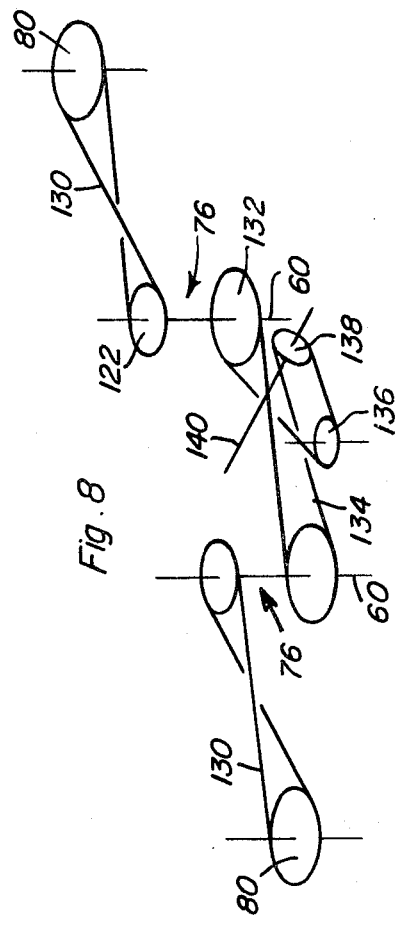
Fig. 2
Fig. 8

HAY TEDDING MACHINE

This invention relates to an agricultural machine for raking, turning and tedding of ground crops.

Hay tedding machines which employ rotary raking assemblies that are supported in adjustably tilted positions by support wheel assemblies, are well known as disclosed for example in U. S. Pat. No. 3,267,656 to Van Der Lely. The mounting of a plurality of such rotary raking assemblies on an articulated frame so that outer pivoted sections may alternatively occupy laterally extended positions or rearwardly trailing positions, is also known as disclosed in U. S. Pat. No. 3,496,712 to Purrer et al. However, such prior articulated frame arrangements are unable to cope with ground irregularity problems because the laterally extended, frame sections are not vertically displaceable relative to the central frame section that is hitched to the towing vehicle. While the pivotal connection of laterally outer frame sections about horizontal axes to a central frame section is known as disclosed in U. S. Pat. No. 3,509,707 to Stampfer, prior hay tedding machines have not been able to combine both the rearwardly folding frame capability and vertically movable outer frame capability because of drive train requirements for the rotary raking assemblies. Even though the use of transmissions employing endless flexible drive belts is well known, even for rotary implements on pivoted frame sections of agrricultural machines as disclosed for example in U. S. Pat. No. 3,545,184 to Liepold et al., such drive trains would still be unsuitable for an arrangement in which the pivoted frame section is vertically displaceable relative to the frame portion hitched to the towing vehicle, because of variations in belt tension that would occur in response to such vertical displacements thereby causing variations in belt slippage and interruptions in the transmission of power.

It is therefore an important object of the present invention to provide a hay tedding machine which features an articulated frame assembly having laterally outer frame sections that are not only rearwardly foldable about vertical axes but are also vertically displaceable relative to the central frame section hitched to a towing vehicle in order to cope with ground irregularities.

A further object in accordance with the foregoing object is to provide a drive train arrangement for the rotary raking assemblies of the hay tedding machine which is continuously operative without variation in transmitted torque in all positions and conditions of the articulated frame assembly.

Yet another object in accordance with the present invention is to provide a hay tedding machine having an articulated frame assembly for supporting a plurality of rotary raking assemblies which avoids the complexities and disadvantages of a positive gear train connection from the input of a power take-off from the towing vehicle to the rotary raking assemblies.

A still further object is to provide a transmission arrangement for hay tedding machines of the aforementioned type which will transmit power without variation in torque despite displacement of frame sections due to ground irregularities and will accommodate slippage in response to momentary overload of the transmission by obstructions encountered by the driven raking assemblies.

In accordance with the present invention, a wheel supported, articulated frame assembly is hitched to a tractor and mounts rotary rake assemblies driven by a power take-off from the tractor. The frame assembly includes a central beam to which the hitch is connected at an adjusted tilt, the central beam extending perpendicular to the direction of travel. Two raking assemblies are mounted at the lateral ends of the central beam for rotation about vertical spindles. Lateral outer beams are pivoted to the central beam about the vertical spindles. The outer beams are also pivotally displaceable relative to the central beam about horizontal axes so as to follow ground irregularities by vertical movement between limits. Two outer rake assemblies are mounted for rotation about vertical spindles at the outer ends of the lateral beams. Each of the rake assemblies has a support wheel carried at the lower end of the spindle about which the rake assembly is rotatable. While the spindles associated with the inner rake assemblies are rotationally fixed to maintain orientation of the wheels in the direction of travel, the laterally outer spindles are releasably locked to the outer beams for re-orientation of the laterally outer support wheel assemblies. Braces holding the outer beams laterally extended may be disconnected from the central beam to interconnect the outer beams in rearwardly trailing positions. In the trailing positions of the outer beams, the spindles are angularly reorientated so that the associated support wheels may operate as casters.

The inner rake assemblies are driven by pulleys drivingly interconnected to the power take-off from the towing tractor by a crossed, endless drive belt. A pair of outer endless drive belts also connect the pulleys at the ends of the central beam to pulleys driving the rake assemblies at the outer ends of the laterally outer beams. The outer, endless drive belts are supported below the beams substantially aligned with planes containing the horizontal axes about which the outer beams are vertically displaceable relative to the central beam, within limits.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a rear elevational view of a hay tedding machine constructed in accordance with the present invention shown in its operative condition.

FIG. 2 is a top plan view of the hay tedding machine shown in FIG. 1.

FIG. 6 is an enlarged partial sectional view taken substantially through a plane indicated by section line 6—6 in FIG. 2.

FIG. 8 is a schematic perspective view showing the drive train arrangement associated with the hay tedding machine.

FIG. 9 is an enlarged partial sectional view taken substantially through a plane indicated by section line 9—9 in FIG. 2.

Figure 4:
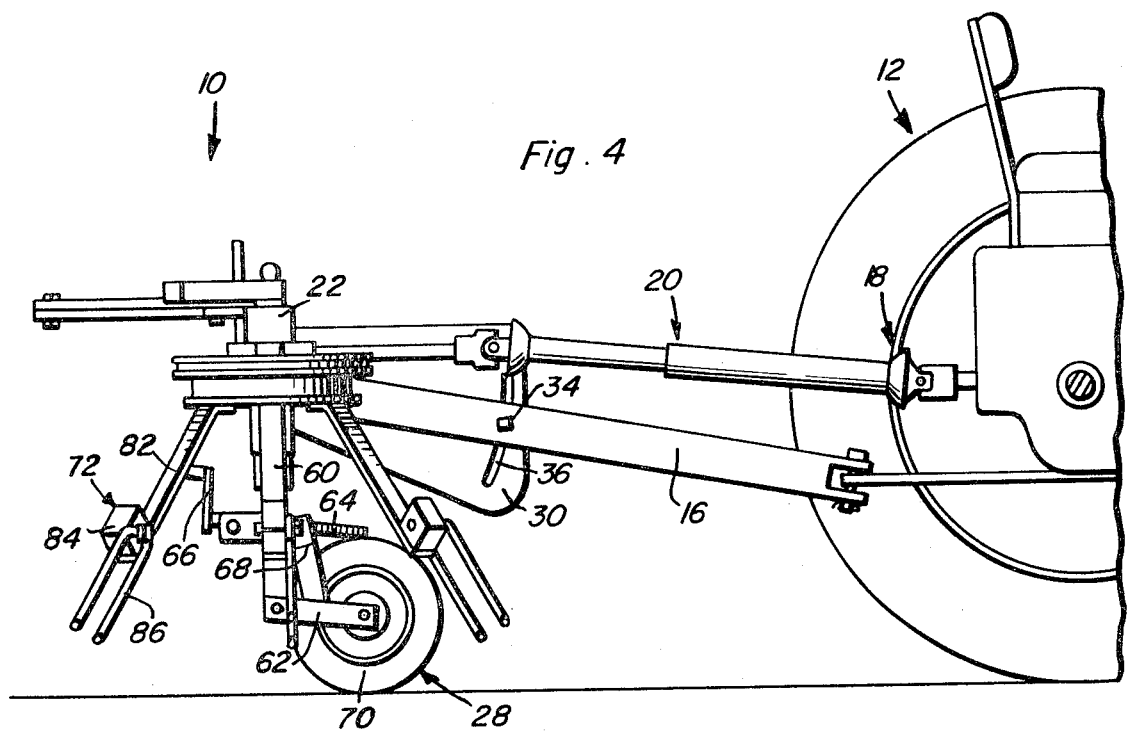
FIG. 4 is a side elevational view of the hay tedding machine shown in a non-operative condition.

Referring now to FIGS. 1, 2 and 4, a hay tedding machine generally denoted by reference numeral 10 is shown hitched to a towing vehicle such as an agricultural tractor 12 as seen in FIG. 4. The tractor is hitched to the articulated frame assembly 14 of the hay tedding machine by means of a pivoted draw bar 16 while power for operating the hay tedding machine is supplied by the tractor through a power take-off 18 which includes a longitudinally extensible power shaft assembly 20.

Figure 5:
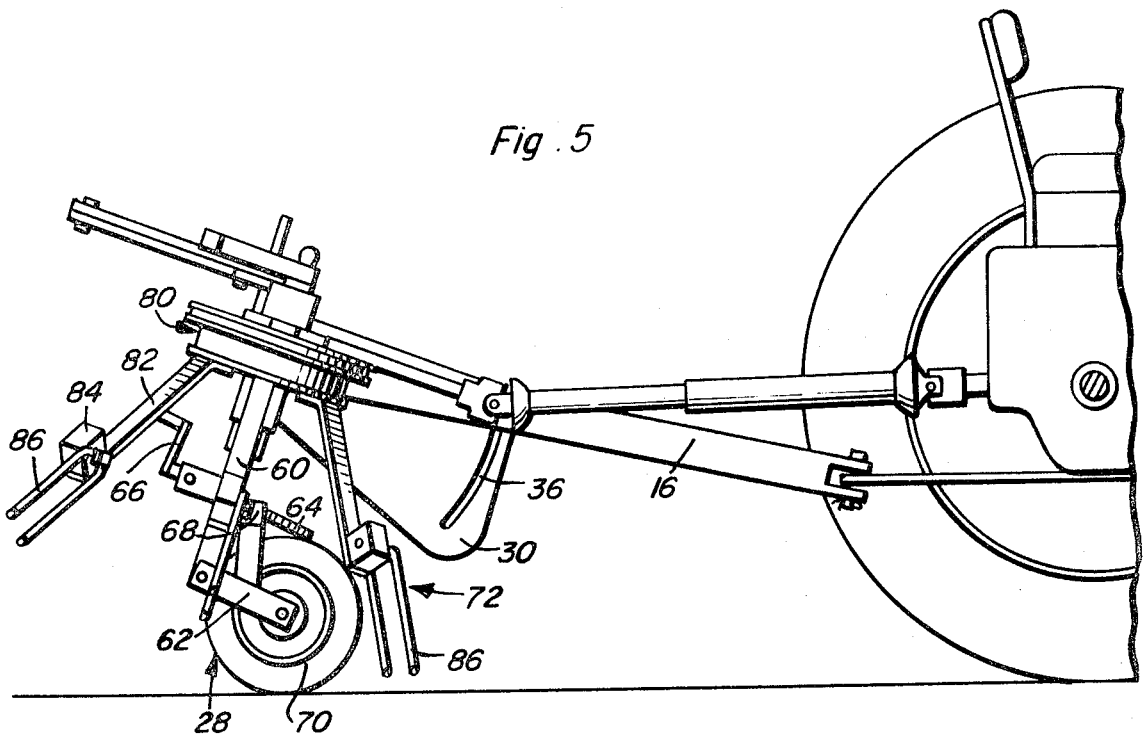
FIG. 5 is a side elevational view of the hay tedding machine shown in an operative condition.

The articulated frame assembly 14 includes a central beam 22 and a pair of laterally outer frame sections in the form of pivoted beams 24 and 26 shown in their extended positions in FIGS. 1 and 2. The frame assembly is supported in spaced relation above the ground by a plurality of support wheel assemblies 28 connected to the outer ends of the central beam 22 and to the laterally outer ends of the beams 24 and 26. The frame assembly 14 is also supported in an adjustably tilted position by its hitch connection to the towing tractor. Thus, the draw bar 16 aforementioned is povitally connected at its rear end to the frame assembly 14 by an adjustment plate 30 fixed to the central beam 22 and disposed substantially in a vertical plane aligned with the direction of travel. As more clearly seen in FIG. 9, a pivot assembly 32 pivotally interconnects the rear end portion of the draw bar 16 to the plate 30. By means of a releasable lock bolt assembly 34, extending through an arcuate adjustment slot 36 in the plate 30, the adjusted angular position between the draw bar 16 and the frame assembly may be set in order to obtain the desired tilt as shown in FIGS. 4 and 5.

Figure 7:
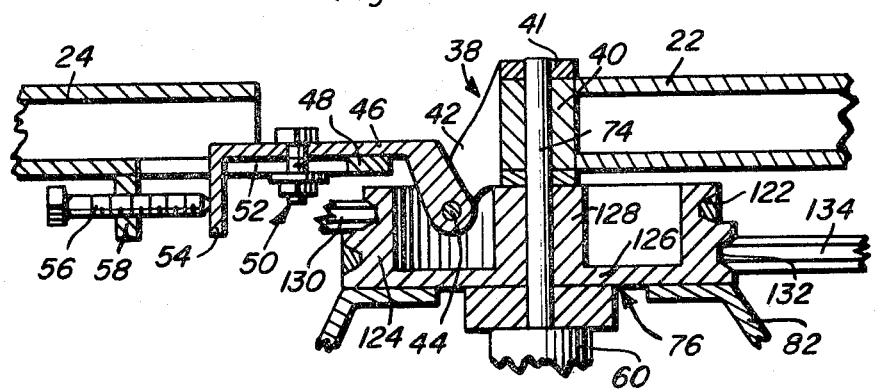
FIG. 7 is an enlarged partial sectional view taken substantially through a plane indicated by section line 7—7 in FIG. 2.

Referring now to FIGS. 2 and 7, a coupling assembly generally referred to by the reference numeral 38 is connected to the opposite lateral ends of the central beam 22 in order to interconnect the central beam with the laterally outer beams 24 and 26. The coupling assembly 38 includes bearing portions 41 engaging a vertical sleeve portion 40 affixed to the end of the central beam and a pair of laterally spaced yoke arms 42 extending from the bearing portions. A horizontal pivot pin 44 is carried by the arms 42 below the beams to support a connecting member 46 that projects into the adjacent end of the associated laterally outer beam in sliding engagement with a slotted extension 48 of the laterally outer beam as more clearly seen in FIG. 7. The connecting member 46 is locked in a longitudinally adjusted position relative to the laterally outer beam by means of a lock bolt assembly 50 extending through the adjustment slot 52 in the extension 48. A downwardly extending flange 54 also projects from the connecting member 46 through the slot 52 for engagement by an adjusting screw 56 threadedly mounted by a nut formation depending from the laterally outer beam at the end of the slot 52. Thus, when the lock nut assembly 50 is loosened, the adjustment screw 56 may be rotated for repositioning the laterally outer beam relative to the coupling assembly 38 to adjust drive belt tension as will be hereafter explained. This same type of adjustment may be effected at either lateral side of the central beam 22.

Each of the support wheel assemblies 28 includes a vertical spindle 60 pivotally connected at its lower end to a wheel yoke 62. An adjusting screw 64 is rotatably mounted on the spindle 60 for rotation by an actuating crank 66 as more clearly seen in FIGS. 4 and 5. The adjusting screw 64 is threadedly mounted within a nut 68 fixed to the wheel yoke 62. Accordingly, by means of the actuating crank 66, the angular position of the wheel yoke 62 relative to the lower end of the spindle 60 may be adjusted in order to vary the height of the frame assembly, supported above the ground by the pneumatically tired wheel 70 rotatably mounted by the wheel yoke 62. Thus, both the tilt and the height of the frame assembly may be adjusted in order to operatively position a plurality of rotary raking assemblies 72, respectively associated with each of the support wheel assemblies 28.

As more clearly seen in FIG. 7, each of the vertical spindles 60 located at the lateral ends of the central beam 22, includes an upper, reduced diameter shaft portion 74 that extends through the sleeve 40 fixed to the end of the central beam 22 and the bearing portions 41 associated with the coupling assembly 38. A pulley wheel generally referred to by reference numeral 76 is rotatably mounted on the shaft portion 74 below the beam 22 at each lateral end thereof and a rotary raking assembly 72 is mounted on the underside of each of the pulley wheels 76.

As more clearly seen in FIG. 6, vertical spindles 60 are also connected to the lateral ends of the laterally outer beams such as the beam 24 by means of upper, reduced diameter shaft portions 74'. The shaft portions 74' extend through a sleeve 78 fixed to the outer ends of the laterally outer beams. A pulley wheel 80 is rotatably mounted on the shaft portion 74' below the laterally outer beam and is substantially aligned in the same plane as the pulley wheel 76 and similarly mounts another of the rotary raking assemblies 72. Each raking assembly includes a plurality of equal angularly spaced, diverging arms 82 secured as by welding to the underside of the associated pulley wheel 76 or 80. A mounting block 84 at the lower ends of each of the arms 82 supports a double pronged fork 86. Thus, when the frame is tilted as shown in FIG. 5, rotation of the rotary raking assembly 72 by its associated pulley wheel will cause the prongs 86 to pick up the crop in the forward positions thereof, raise it off the ground and then release it as it reaches the rearward position to thereby move the crops sidewise and backward and spread it in a manner suitable for drying.

It will be apparent from the foreoing description, that the lateral beams 24 and 26 are vertically displaceable relative to the central beam 22 about the horizontal axes through the pivot shafts 44 associated with the coupling assemblies 38. Thus, the laterally outer beams 24 and 26 will be vertically displaced in response to ground irregularities transverse to the direction of movement despite the lateral extent of the frame assembly in its extended condition as shown in FIGS. 1 and 2. The amount by which the laterally outer beams 24 and 26 are vertically displaceable relative to the central beam is, however, limited by means of a stop element 88 fixed to the top of each of the laterally outer beams intermediate the ends thereof as shown in FIGS. 1 and 2. The stop element 88 is received within the fork formation 90 at the laterally outer end of a limit control plate 92 secured to one of the yoke arms 42 associated with a coupling assembly 38.

Figure 3:
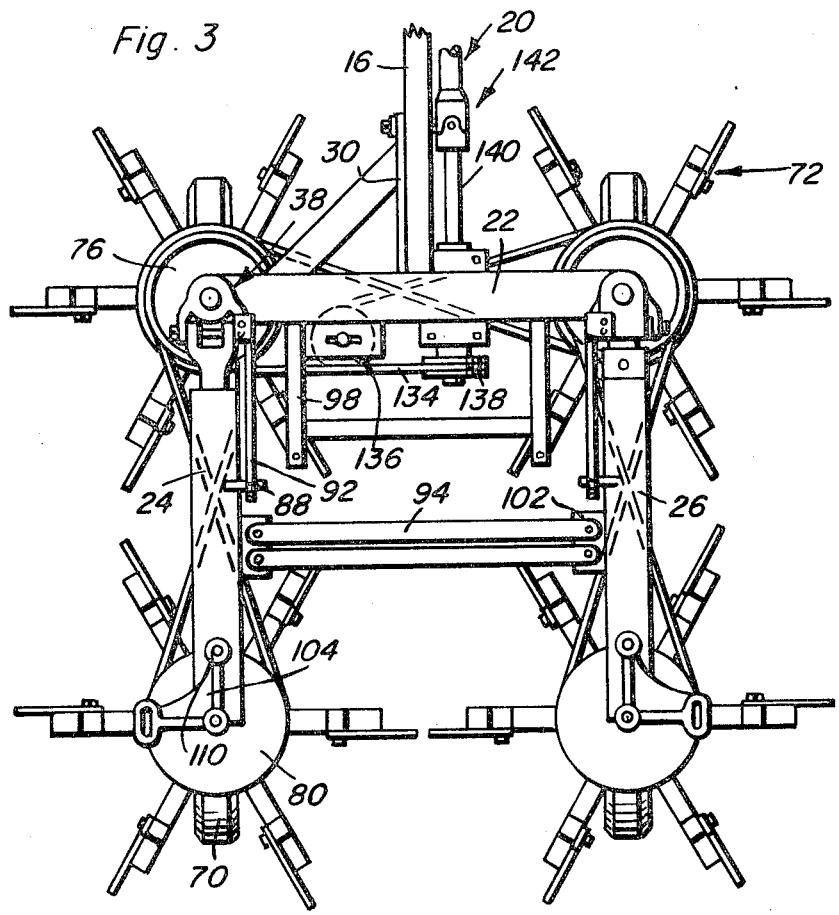
FIG. 3 is a top plan view of the hay tedding machine shown in a transport condition.

As shown in FIG. 2, the frame assembly 14 is locked in its extended condition by means of braces 94 releasably connected at 96 to rearward extensions 98 from the central beam 22 while permanently connected to pivots 100 to rearward extensions 102 from the laterally outer beams 24 and 26. When the braces 94 are disconnected from the extensions 98, the laterally outer beams 24 and 26 may be folded rearwardly to positions perpendicular to the central beam 22 as shown in FIG. 3. Both braces 94 may then be interconnected between the extensions 102 in order to lock the frame assembly in its transport condition.

In the laterally extended condition of the frame assembly, the laterally outer wheel assemblies 28 are angularly oriented by their vertical spindles 60 so that the support wheels 70 will be aligned in the direction of travel. A steering control sector 104 as shown in FIGS. 2 and 6, is connected to the upper ends of the shaft portions 74' associated with the vertical spindles at the outer ends of the beams 24 and 26 in order to maintain proper orientation of the wheels 70. Thus, in the extended condition of frame assembly as shown in FIGS. 2 and 6, a pin 106 is received within opening 108 formed in the laterally outer beam, which is aligned with a slot 110 in the steering control sector 104 thereby permitting the support wheel 70 to deviate by a small amount from a position aligned in the direction of travel. To fold the frame assembly to its transport condition as shown in FIG. 3, the pin 106 is removed and the spindle 60 re-orientated so as to align the openings 108 in the beams 24 and 26 with an opening 112 in the steering control sector 104 located 90° from the slot 110. The pin when inserted through the aligned openings 112 and 108, will then hold the wheels 70 aligned in the direction of travel for the rearwardly folded transport condition of the frame assembly as shown in FIG. 3.

Each of the pulley wheels 80 includes a bearing portion 114 journaled on the shaft portions 74' as shown in FIG. 6 and connected by a lower web portion 116 to an outer rim 118 on which a single V-shaped pulley groove 120 is formed. The pulley groove 120 is substantially aligned in the same plane as an uppermost pulley groove 122 formed in the radially outer rim portion 124 of the pulley wheel 76 as shown in FIG. 7. The rim portion 124 is connected by a web 126 to a hub portion 128 which is journaled on the shaft portion 74 of the vertical spindle at the laterally outer end of the central beam 22. The plane that extends through the pulley grooves 120 of the pulley wheel 80 and the pulley groove 122 of the pulley wheel 76, also contains the horizontal axis extending through the pivot shaft 44 associated with the coupling assembly 38. Thus, a crossed, endless drive belt 130 which drivingly interconnects the pulley wheels 76 and 80, will receive little distortion and will remain under constant tension despite pivotal displacement of the laterally outer beam 24 or 26 relative to the central beam 22 about the axis extending through the pivot shaft 44. The tension in the endless drive belt 130 may be adjusted through the adjusting screw 56 aforementioned, by varying the distance between the vertical spindles on which the pulley wheels 76 and 80 are rotatable.

The pulley wheels 76 unlike the pulley wheels 80, are provided with lower pulley grooves 132 about which an endless drive belt 134 is entrained. The drive belt 134 in addition to being entrained about both of the pulley wheels 76 at the opposite lateral ends of the central beam 22, is also entrained about an idler pulley 136 rotatably mounted on the underside of the central beam 22 for rotation about a vertical axis parallel to the vertical spindles 60 about which the pulley wheels 76 are rotatable but in a plane slightly spaced therebelow in order to accommodate a quarter turn of the drive belt which is also entrained about a drive pulley 138 connected to an input drive shaft 140 which is supported by the central beam 22 for rotation about a horizontal axis. The drive shaft 140 is connected by means of a universal joint 142 to the power take-off shaft assembly 20. Thus, the endless drive belt 134 drivingly interconnects the drive pulley 138 with both of the pulley wheels 76 and its tension may be adjusted by adjustable positioning of the axis of the idler pulley wheel 136 longitudinally along the central beam 22. As more clearly seen in FIG. 8, the drive belt 134 in addition to executing a one-quarter turn, also is entrained in cross-over relationship about the pulley wheels 76 so as to impart rotation to the associated raking assemblies in opposite directions as indicated by the arrows 144 in FIG. 2. The cross-over relationship of the outer drive belts 130 between the drive pulleys 76 and 80, produces rotation of the laterally outer raking assemblies in directions opposite to the rotational directions of the inner raking assemblies as indicated by the arrows 146 in FIG. 2. Thus, the crop will be windrowed between the two raking assemblies on opposite lateral sides of the central beam.

It will be apparent from the foregoing description, that the flexible drive belt transmission arrangement of the present invention will provide for yieldability and slippage so that if any of the rotary raking assemblies encounters an obstruction causing overload, no rupture of parts will occur. The raking assembly engaged by an obstruction will momentarily stop until the obstruction is removed. On the other hand, the belt transmission arrangement described will transmit continuous and constant torque without variation despite lateral ground irregularities causing pivotal displacement of the laterally outer beams relative to the central beam. This capability of the transmission arrangement results from the fact that the laterally outer beams are pivotally displaceable about horizontal axes extending through the pivot shafts 44 supported by the coupling assemblies 38 (between the hub portions 128 and outer rim portions 124 of the pulley wheels 76) in a plane common to the plane with which the laterally outer drive belts 130 are aligned. Thus, because of this transmission arrangement, the hay tedding machine of the present invention features both an articulated frame assembly which is rearwardly folded to a transport position and means for accommodating ground irregularities by displacement of the laterally outer beams.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an agricultural machine or the like, a frame, at least one support, a driven device carried by said support, coupling means operatively connecting the support to the frame for pivotal displacement of the support relative to the frame about two transverse axes, power driven wheel-like means mounted by the frame for rotation about one of said axes, and flexible transmission means substantially aligned in a plane common to the other of said axes for drivingly connecting the wheel means to the driven device in all positions of the support relative to the frame.

2. The combination of claim 1 wherein said axes are disposed in closely spaced, perpendicular relation to each other.

3. The combination of claim 2 wherein said flexible transmission means comprises an endless drive belt.

4. The combination of claim 3 wherein said wheel-like means comprises a pulley having at least two grooves, said drive belt being entrained about the pulley within one of the grooves.

5. The combination of claim 4 including a second driven device mounted by said frame for rotation about said one of the axes.

6. The combination of claim 5 including stop means for limiting pivotal displacement of the support about said other of the axes relative to the frame.

7. The combination of claim 6 including means for rotatably mounting the first mentioned driven device on the support about an axis parallel to said one of the two transverse axes.

8. The combination of claim 7 including means for locking the support in at least two angularly related positions about said one of the axes relative to the frame.

9. The combination of claim 8 including yieldable transmission means mounted by the frame for imparting rotation to the power driven wheel-like means.

10. The combination of claim 9 wherein said yieldable transmission means includes a quarter turn, endless drive belt entrained about the pulley within the other of the grooves.

11. The combination of claim 10 wherein said frame includes a beam disposed substantially in coplanar relation to the support and vertically spaced above the plane with which the flexible transmission means is aligned.

12. The combination of claim 1 wherein said flexible transmission means comprises an endless drive belt.

13. The combination of claim 12 wherein said wheel-like means comprises a pulley having at least two grooves, said drive belt being entrained about the pulley within one of the grooves.

14. The combination of claim 13 including yieldable transmission means mounted by the frame for imparting rotation to the power driven wheel means.

15. The combination of claim 14 wherein said yieldable transmission means includes a quarter turn, endless drive belt entrained about the pulley within the other of the grooves.

16. The combination of claim 1 including stop means for limiting pivotal displacement of the support about said other of the axes relative to the frame.

17. The combination of claim 16 including means for locking the support in at least two angularly related positions about said one of the axes relative to the frame.

18. The combination of claim 1 including means for locking the support in at least two angularly related positions about said one of the axes relative to the frame.

19. The combination of claim 1 wherein said frame includs a beam disposed substantially in coplanar relation to the support and vertically spaced above the plane with which the flexible transmission means is aligned.

20. In an agricultural machine having a frame adapted to be towed in a forward direction; a support beam pivotally displaceable about a folding axis fixed to the frame, supporting wheel means pivotally connected to the support beam about a steering axis parallel to said folding axis, a pair of crop engaging implements operatively mounted by the frame and the support beam for rotation about said folding and steering axes respectively, means pivotally connecting the support beam to the frame for limited relative displacement about a horizontal axis fixed to the support beam and drive means for continuously transmitting power to said crop engaging implements in all instantaneous positions of the support beam relative to the frame.

21. The combination of claim 20 wherein said drive means includes a pair of drive wheel-like members respectively connected to said crop engaging implements for rotation about said parallel folding and steering axes, and an endless drive belt entrained about said drive wheel-like members substantially in a plane containing the horizontal axis fixed to the support beam.

* * * * *